United States Patent
Boucher et al.

(10) Patent No.: US 8,231,991 B2
(45) Date of Patent: Jul. 31, 2012

(54) PROCESS FOR MAKING FILL HOLE IN A WALL OF AN ENERGY STORAGE DEVICE

(75) Inventors: Paul Michael Boucher, Lake Elmo, MN (US); Steven Edward Messer, Plymouth, MN (US); Walter Carl Sunderland, Eagan, MN (US); Benjamin Adam Matter, Brooklyn Park, MN (US)

(73) Assignee: Medtronic, Inc., Minneapolis, MN (US)

( * ) Notice: Subject to any disclaimer, the term of this patent is extended or adjusted under 35 U.S.C. 154(b) by 508 days.

(21) Appl. No.: 12/539,193

(22) Filed: Aug. 11, 2009

(65) Prior Publication Data

US 2010/0304194 A1 Dec. 2, 2010

Related U.S. Application Data

(60) Provisional application No. 61/182,291, filed on May 29, 2009.

(51) Int. Cl.
*H01M 10/44* (2006.01)
*H01M 2/02* (2006.01)
*H01M 69/02* (2006.01)

(52) U.S. Cl. ......... 429/50; 429/185; 29/623.2; 156/250; 264/155

(58) Field of Classification Search .................... 429/50, 429/121, 185, 122, 89; 29/623.2; 361/500; 264/155; 156/250; 381/502, 503, 518; 220/677
See application file for complete search history.

(56) References Cited

U.S. PATENT DOCUMENTS

| | | | |
|---|---|---|---|
| 5,776,632 A | 7/1998 | Honegger | |
| 6,117,195 A | 9/2000 | Honegger | |
| 6,361,898 B1 | 3/2002 | Honegger | |
| 6,673,489 B2 * | 1/2004 | Fong et al. | 429/181 |
| 7,083,339 B2 * | 8/2006 | Piccinino et al. | 396/612 |
| 7,205,068 B2 * | 4/2007 | Fong et al. | 429/122 |
| 7,381,494 B2 * | 6/2008 | Fong et al. | 429/89 |
| 7,442,466 B2 * | 10/2008 | Casby et al. | 429/163 |
| 7,553,578 B2 * | 6/2009 | Wald et al. | 429/483 |
| 2003/0183515 A1 | 10/2003 | Heller, Jr. | |
| 2004/0161666 A1 * | 8/2004 | Haas et al. | 429/185 |
| 2005/0226995 A1 * | 10/2005 | Maharshak et al. | 427/96.9 |
| 2007/0177448 A1 | 8/2007 | Casby et al. | |
| 2007/0179552 A1 | 8/2007 | Dennis et al. | |
| 2008/0106849 A1 * | 5/2008 | Gramm et al. | 361/500 |
| 2008/0259525 A1 * | 10/2008 | Guillet et al. | 361/502 |
| 2009/0136839 A1 * | 5/2009 | Kraznov et al. | 429/160 |
| 2010/0304194 A1 * | 12/2010 | Boucher et al. | 429/50 |

FOREIGN PATENT DOCUMENTS

EP 1753051 2/2007

OTHER PUBLICATIONS (PCT/US2010/034290) PCT Notification of Transmittal of the International Search Report and the Written Opinion of the International Searching Authority, Mailed Nov. 16, 2010, 7 pages.

* cited by examiner

*Primary Examiner* — Ana Fortuna

(57) ABSTRACT

A method of forming an energy storage device includes forming a fill hole in a wall of the energy storage device. The method also includes deforming the wall of the energy storage device to reduce a width of the fill hole. Moreover, the method includes sealing the fill hole.

24 Claims, 2 Drawing Sheets

PROCESS FOR MAKING FILL HOLE IN A WALL OF AN ENERGY STORAGE DEVICE

CROSS-REFERENCE TO RELATED APPLICATIONS

This application claims the benefit of U.S. Provisional Application No. 61/182,291, filed on May 29, 2009. The entire disclosure of the above application is incorporated herein by reference.

FIELD

The present disclosure relates generally to an energy storage device and, more particularly, relates to a process for making a fill hole in a wall of an energy storage device.

INTRODUCTION

Energy storage devices, such as batteries, typically include a housing that encloses a cathode, an anode, and other components. During manufacturing, a fill hole is formed in the housing. Then, electrolyte fluid is introduced into the housing through the fill hole. Subsequently, the fill hole is sealed.

If the wall thickness of the battery housing is especially thick, a relatively wide diameter punching tool may be needed to effectively form the fill hole through the wall and to avoid damaging the punching tool. Accordingly, the fill hole can be relatively wide, which can inhibit sealing of the fill hole and/or can lead to leakage of electrolyte through the fill hole.

SUMMARY

This section provides a general summary of the disclosure, and is not a comprehensive disclosure of its full scope or all of its features.

A method of forming an energy storage device is disclosed. The method includes forming a fill hole in a wall of the energy storage device. The method also includes deforming the wall of the energy storage device to reduce a width of the fill hole. Moreover, the method includes sealing the fill hole.

In another aspect, a method of forming a battery is disclosed. The method includes punching a fill hole of the wall of the battery. The method also includes plastically deforming the wall of the battery to reduce a width of the fill hole. Furthermore, the method includes introducing an electrolyte into the battery through the fill hole. Also, the method includes laser welding the wall to seal the fill hole and welding a redundant sealing member to the wall after laser welding to substantially cover and redundantly seal a sealed area of the wall.

In still another aspect, an energy storage device is disclosed. The energy storage device includes a housing, an electrolyte contained in the housing, and a fill port assembly defined in the housing through which the electrolyte is introduced into the housing. The fill port assembly includes a sealed area, and the sealed area includes a fill hole that has been reduced in width and sealed.

Moreover, a method of using an energy storage device is disclosed. The method includes providing the energy storage device having a housing that includes a wall and a fill port assembly defined in the wall. The fill port assembly includes a sealed area, and the sealed area includes a fill hole that has been reduced in width and sealed. The fill hole can be for introducing an electrolyte into the housing. The method further includes generating energy with the energy storage device and supplying the energy to a medical device.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

FIGS. 2A-2D are each side views of the fill port assembly of FIG. 1 during manufacture thereof, wherein FIG. 2A illustrates initial manufacturing, FIG. 2B illustrates subsequent manufacturing, FIG. 2C illustrates further subsequent manufacturing, and FIG. 2D illustrates even further subsequent manufacturing;

FIGS. 3A-3B are side views of the fill port assembly of FIG. 1 during another exemplary embodiment of manufacture thereof, wherein FIG. 3A illustrates initial manufacturing, and FIG. 3B illustrates subsequent manufacturing;

FIGS. 4A-4B are side views of the fill port assembly of FIG. 1 during another exemplary embodiment of manufacture thereof, wherein FIG. 4A illustrates initial manufacturing, and FIG. 4B illustrates subsequent manufacturing;

DETAILED DESCRIPTION

Figure 1:
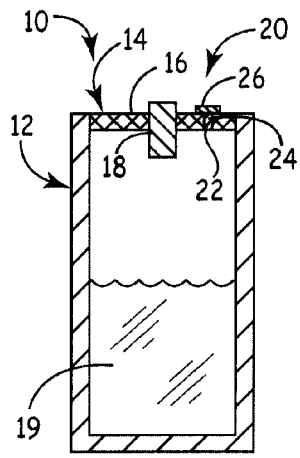
FIG. 1 is a sectional view of an exemplary embodiment of a battery with a fill port assembly according to various teachings of the present disclosure.

The following description is merely exemplary in nature and is not intended to limit the present disclosure, application, or uses. It should be understood that throughout the drawings, corresponding reference numerals indicate like or corresponding parts and features.

Referring initially to FIG. 1, an energy storage device, such as a battery 10, is illustrated according to one exemplary embodiment of the present disclosure. The battery 10 can be used to chemically store energy for any suitable device. In some of the exemplary embodiments, the battery 10 can be used to supply power to a medical device, such as an implantable pacemaker device or implantable defibrillation device (not shown). Also, it will be appreciated that the present disclosure can be applied to any suitable energy storage device other than the battery 10.

The battery 10 can include a housing 12. The housing 12 can have any suitable shape. Also, the housing 12 can encase an anode, a cathode and other suitable known battery elements (not shown) for generating and transmitting electricity. Furthermore, the housing 12 can be made out of any suitable material, such as titanium, stainless steel, aluminum or any alloy thereof.

Additionally, the housing 12 can include a header assembly 14 having a top wall 16 and an electrode 18 that extends through the top wall 16 to electrically connect to the anode or cathode (not shown) inside the housing 12. The header assembly 14 can also include a fill port assembly 20. The fill port assembly 20 can include a fill hole 22 that extends completely through the top wall 16. The fill hole 22 is sealed by a first sealing element to define a sealed area 24 as will be discussed. It will be appreciated that the fill port assembly 20 can be included in any other suitable area of the housing 12 other than the header assembly 14 without departing from the scope of the present disclosure.

As will be discussed, the fill hole 22 is formed through the housing 12, and an electrolyte 19 of any suitable type can be introduced into the housing 12 through the fill hole 22. The fill hole 22 can be subsequently sealed hermetically to define the sealed area 24 and to reduce the likelihood of leakage of the electrolyte 19 from the battery 10.

Moreover, the battery 10 can include a second or redundant sealing member 26 that is fixedly coupled to the header assembly 14 to substantially cover the sealed area 24. The sealing member 26 can have any suitable shape, such as a round disk shape. It will be appreciated that the sealing member 26 redundantly seals the fill hole 22, making leakage from the fill hole 22 unlikely.

Now, referring to FIGS. 2A through 2D, an exemplary embodiment of a method of manufacturing the fill port assembly 20 will be discussed. As shown in FIGS. 2A through 2D, the fill port assembly 20 can be formed in the top wall 16 of the battery 10, which is partially shown. It will be appreciated that the top wall 16 can be manufactured and coupled to the other portions of the housing 12 in any suitable fashion.

Figure 2A:
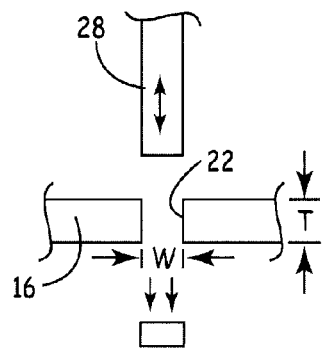

As shown in FIG. 2A, the manufacturing method can begin by forming the fill hole 22 in the top wall 16. The fill hole 22 can be formed to have a substantially circular cross section. The fill hole 22 can be formed with a reciprocating punching tool 28 of a known type. Specifically, the punching tool 28 reciprocates and extends through the top wall 16 to form the fill hole 22. It will be appreciated that the fill hole 22 can also be formed in the top wall 16 in any suitable fashion other than a punching process. For instance, the fill hole 22 can also be formed by a machining process. More specifically, the fill hole 22 can be formed in a drilling process, such as a laser drilling process, or any other suitable manufacturing method for forming holes. The fill hole 22 can be formed by removing material from the top wall 16 or by forming the fill hole 22 without removing material from the top wall 16. Also, the top wall 16 can have a sufficiently low hardness to allow the fill hole 22 to be formed without damaging the tool 28.

The fill hole 22 can have a width W (e.g., a diameter) of any suitable value. In some exemplary embodiments the width W is substantially equal to or greater than a thickness T of the top wall 16. In other words, the aspect ratio of the width to the thickness can be approximately 1:1. For instance, where the thickness T of the top wall 16 is approximately 0.032 inches thick, the width of the fill hole 22 is approximately 0.032 inches. Accordingly, maintaining this aspect ratio of the fill hole 22 can ensure that the fill hole 22 is properly formed and can avoid damaging the punching tool 28. Thus, the fill hole 22 can be formed in a relatively thick top wall 16 (e.g., thickness T≧0.015 inches); however, sealing the fill hole 22 at the above-discussed width W can be problematic.

Figure 2B:
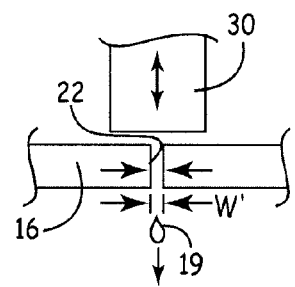

Thus, as shown in FIG. 2B, the manufacturing method can include deforming the top wall 16 to reduce the width of the fill hole 22. Specifically, the top wall 16 can be deformed from the initial width W (FIG. 2A) to a reduced width W' (FIG. 2B).

The fill hole 22 can be reduced in width using any suitable manufacturing method and tool. For instance, the top wall 16 can be stamped and/or coined using a reciprocating tool 30 in order to plastically deform the top wall 16 and reduce the width of the fill hole 22.

It will be appreciated that the fill hole 22 can be reduced to any suitable width W'. For instance, where the initial width W (FIG. 2A) is approximately 0.032 inches, the reduced width W' (FIG. 2B) is at most approximately 0.016 inches. As will be discussed, reducing the width of the fill hole 22 ensures proper sealing of the fill hole 22.

It will be appreciated that the processes illustrated in FIGS. 2A and 2B can be individually or both performed when the top wall 16 is separate from other portions of the housing 12. Alternatively, these processes can be individually or both performed when attached to other portions of the housing 12. Also, the electrolyte 19 can be introduced into the housing 12 through the fill hole 22 after formation of the fill hole 22 as represented in FIG. 2A or after the width of the fill hole 22 is reduced as represented in FIG. 2B.

Figure 2C:
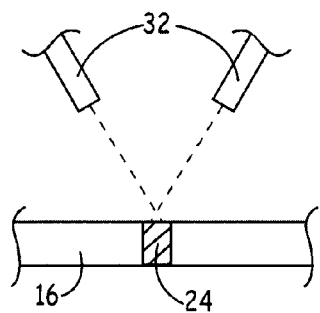

Subsequently, as shown in FIG. 2C, the fill hole 22 is hermetically sealed using a sealing tool 32. It will be appreciated that the sealing tool 32 can be of any suitable type, such as a welding tool. More specifically, the sealing tool 32 can be a laser welding tool or any other welding tool. The sealing tool 32 can allow for autogenous welding (i.e., pyrometallurgical welding that is self-sufficient such that, once the welding process is started, it produces enough heat to completely seal the fill hole 22 without any additional external input). The sealing process creates the sealed area 24 in the top wall 16. Accordingly, the sealed area 24 can limit and substantially eliminate leakage of electrolyte from the housing 12 of the battery 10.

Figure 2D:
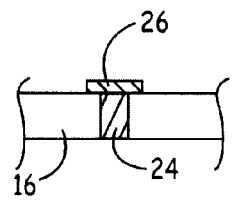

Next, as shown in FIG. 2D, the second or redundant sealing member 26 can be fixedly coupled to the top wall 16 substantially over the sealed area 24 to redundantly seal the fill hole 22. It will be appreciated that the redundant sealing member 26 can be fixed to the wall 16 in any suitable fashion. For instance, the redundant sealing member 26 can be fixed to the top wall 16 via a welding process. By redundantly sealing the fill hole 22, the redundant sealing member 26 further decreases the likelihood of any leakage of electrolyte from the housing 12 of the battery 10.

Thus, the method of forming and sealing the fill hole 22 represented in FIGS. 2A through 2D allows the fill hole 22 to be formed in a relatively thick top wall 16 of the battery 10. Yet, the fill hole 22 can be properly sealed. Also, the redundant sealing member 26 additionally ensures that leakage from the housing 12 is unlikely. It will also be appreciated that the process of FIGS. 2A through 2D is efficient and cost effective.

Figure 3A:
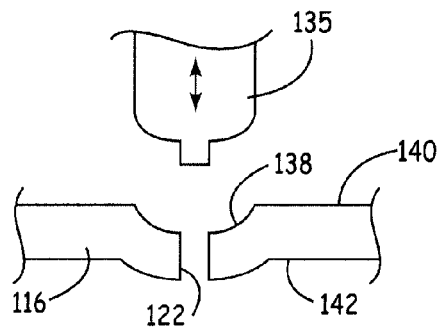
Figure 3B:
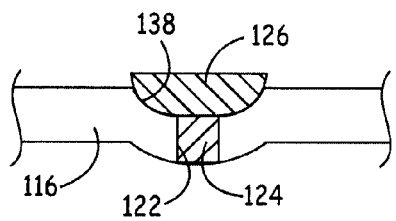

Referring now to FIGS. 3A and 3B, an alternative exemplary embodiment of a manufacturing process for forming the fill hole 122 will be discussed. Components corresponding to those of FIGS. 1 through 2D will be identified by corresponding reference numerals increased by 100.

As shown in FIG. 3A, a recess 138 can be formed in the top wall 116, adjacent the fill hole 122. The recess 138 can be formed using a reciprocating recess forming tool 135. It will be appreciated that the tool 135 could be incorporated in a punching tool, such as the punching tool 28 represented in FIG. 2A such that the recess 138 is formed substantially at the same time as the formation of the fill hole 122. Also, the tool 135 could be incorporated in the tool 30 represented in FIG. 2B such that the recess 138 is formed substantially at the same time as the width W' of the fill hole 122 is reduced.

It will be appreciated that the recess 138 could have any suitable shape, such as a concave or bowl shape. Furthermore, it will be appreciated that the formation of the recess 138 can deform one or both of an outer surface 140 and an inner surface 132 of the wall 116. For instance, as shown in FIG. 3A, the formation of the recess 138 can cause formation of the recess 138 in the outer surface 140 while also causing the inner surface 142 to project convexly. Thus, both the inner and outer surfaces 142, 140 are nonplanar adjacent the fill hole 122.

Next, as shown in FIG. 3B, the fill hole 122 is hermetically sealed to create the sealed area 124, and the redundant sealing member 126 is fixedly coupled to the wall 11 6 in a manner substantially similar to that discussed above. As shown in FIG. 3B, the redundant sealing member 126 can have a shape substantially corresponding to the recess 138 and can be fixedly coupled to the wall 116 within the recess 138. Accordingly, because the redundant sealing member 126 is disposed within the recess 138, the sealing member 126 can have a lower profile on the wall 116.

Figure 4A:
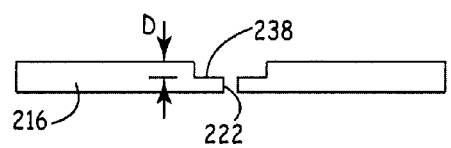
Figure 4B:
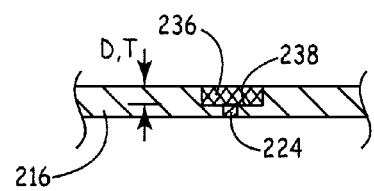

Referring now to FIGS. 4A and 4B, an alternative exemplary embodiment of forming and sealing the fill hole 222 will be discussed. Components similar to the exemplary embodiment of FIGS. 1 through FIGS. 2D will be identified with corresponding reference numerals increased by 200.

As shown in FIG. 4A, the recess 238 can have a substantially open rectangular shaped cross-section and can be substantially centered over the fill hole 222. The recess 238 can have a depth D (FIG. 4A), and the redundant sealing member 236 can have a thickness T that is substantially equal to or less than the depth D of the recess 238 (FIG. 4B). Accordingly, the sealing member 236 can be disposed substantially (e.g., completely) within the recess 238 to have a relatively low profile with respect to the wall 216.

Figure 5:
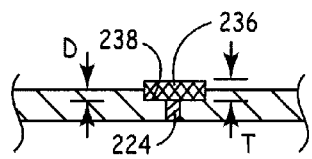
FIG. 5 is a side view of the fill port assembly of FIG. 1 during another exemplary embodiment of manufacture thereof.

In another exemplary embodiment represented in FIG. 5, the thickness T of the sealing member 236 is greater than the depth D of the recess 238. Accordingly, the sealing member 236 extends partially out of the recess 238.

In the exemplary embodiments of FIGS. 4A through 5, the sealing member 236 substantially fills the recess 238. However, it will be appreciated that the sealing member 236 can be configured to only partially fill the recess 238.

Figure 6:
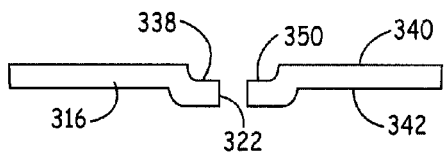
FIG. 6 is a side view of the fill port assembly of FIG. 1 during another exemplary embodiment of manufacture thereof.

Referring now to FIG. 6, another exemplary embodiment of the recess 338 is illustrated. Components that are similar to those of the exemplary embodiment of FIGS. 1 through 2D are indicated with corresponding reference numerals increased by 300.

As shown in FIG. 6, the recess 338 can be substantially concave or bowl-shaped, similar to the exemplary embodiments of FIGS. 3A and 3B. However, as shown in FIG. 6, the recess 338 can have a substantially flat bottom surface 350 surrounding the fill hole 322. As discussed above, the recess 338 can be formed simultaneously as the fill hole 322 is formed, simultaneously while the top wall 316 is plastically deformed to reduce the width of the fill hole 322, or can be formed independent of those processes.

Figure 7:
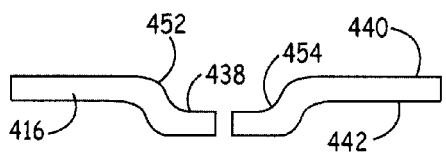
FIG. 7 is a side view of the fill port assembly of FIG. 1 during another exemplary embodiment of manufacture thereof.

Referring now to FIG. 7, another exemplary embodiment of the recess 438 is illustrated. Components that are similar to the exemplary embodiments of FIGS. 1 through 2D are indicated by corresponding reference numerals increased by 400.

As shown in FIG. 7, the recess 438 can be substantially bowl-shaped. Also, the recess 438 can include an upper rim 452 having a radius. Furthermore, the recess 438 can include an interior radius 454.

Figure 8:
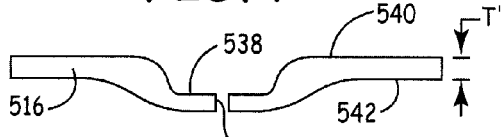
FIG. 8 is a side view of the fill port assembly of FIG. 1 during another exemplary embodiment of manufacture thereof.

Referring now to FIG. 8, another exemplary embodiment of the recess 538 is illustrated. Components that are similar to those of the exemplary embodiment of FIGS. 1 through 2D are indicated with corresponding reference numerals increased by 500.

As shown, formation of the recess 538 causes the thickness T' to vary along the length of the wall 516 adjacent the fill hole 522. More specifically, the wall 516 is thinner adjacent the fill hole 522 and within the recess 538, as compared to other surrounding areas of the wall 516.

Figure 9:
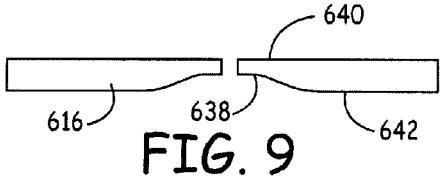
FIG. 9 is a side view of the fill port assembly of FIG. 1 during another exemplary embodiment of manufacture thereof.

Referring now to FIG. 9, another exemplary embodiment of the recess 638 is illustrated. Components corresponding to the exemplary embodiments of FIGS. 1 through 2D are indicated with corresponding reference numerals increased by 600.

As shown in FIG. 9, the recess 638 can be formed on the inner surface 642 of the wall 616. Also, the outer surface 640 can be substantially flat.

Figure 10:
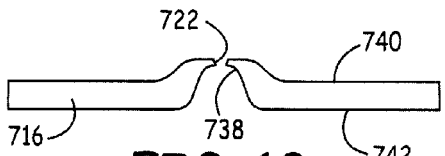
FIG. 10 is a side view of the fill port assembly of FIG. 1 during another exemplary embodiment of manufacture thereof.

Referring now to FIG. 10, another exemplary embodiment of the recess 738 is illustrated. Components that are similar to the exemplary embodiments of FIGS. 1 through 2D are indicated with corresponding reference numerals increased by 700.

As shown, the recess 738 is formed on the inner surface 742 of the wall 714. In addition, the recess 738 is formed such that the outer surface 740 projects convexly. In addition, the recess 738 is formed such that the areas of the wall 716 surrounding the fill hole 722 are substantially thinner than other areas of the wall 716.

Figure 11:
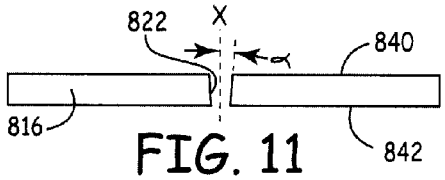
FIG. 11 is a side view of the fill port assembly of FIG. 1 during another exemplary embodiment of manufacture thereof.

Referring now to FIG. 11, another exemplary embodiment of the fill hole 822 is illustrated. Components that are similar to the exemplary embodiments of FIGS. 1 through 2D are indicated in corresponding reference numerals increased by 800.

As shown in FIG. 11, the fill hole 822 can be formed such that the fill hole 822 is tapered. More specifically, the fill hole 822 can be tapered at an angle a relative to an axis X of the fill hole 822. As discussed above, the fill hole 822 can be tapered while the fill hole 822 is initially formed, while the width of the fill hole 822 is reduced, or independently of these processes. In some exemplary embodiments, the fill hole 822 is tapered such that the fill hole is wider adjacent the outer surface 840; however, in other exemplary embodiments, the fill hole 822 can be tapered such that the fill hole 822 is wider adjacent the inner surface 842.

Figure 12:
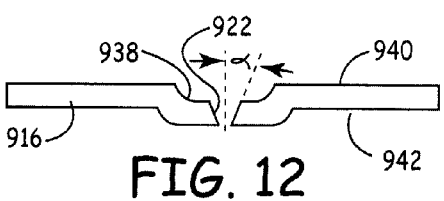
FIG. 12 is a side view of the fill port assembly of FIG. 1 during another exemplary embodiment of manufacture thereof.

Referring now to FIG. 12, another exemplary embodiment of the top wall 916 is illustrated. Components that are similar to the exemplary embodiments of FIGS. 1 through 2D are indicated at corresponding reference numerals increased by 900. As shown, the top wall 916 can be formed to include a recess 938 that is substantially bowl-shaped and formed in the outer surface 940. In addition, the fill hole 922 can be tapered at an angle a, substantially similar to the exemplary embodiment of FIG. 11.

Certain terminology is used herein for purposes of reference only, and thus is not intended to be limiting. For example, terms such as "upper," "lower," "above," "below," "top," "upward," and "downward" refer to directions in the drawings to which reference is made. Terms such as "front," "back," "rear," and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second," and other such numerical terms referring to structures do not imply a sequence or order unless clearly indicated by the context.

When introducing elements or features and the exemplary embodiments, the articles "a," "an," "the" and "said" are intended to mean that there are one or more of such elements or features. The terms "comprising," "including," and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A method of forming an energy storage device comprising:
    forming a fill hole in a wall of the energy storage device;
    plastically deforming the wall of the energy storage device to reduce a width of the fill hole wherein plastically deforming the wall of the energy storage device comprises at least one of stamping the wall of the energy storage device and coining the wall of the energy storage device; and
    sealing the fill hole.

2. The method of claim 1, wherein forming the fill hole includes at least one of punching the fill hole in the wall of the energy storage device, machining the fill hole in the wall of the energy storage device, and laser drilling the fill hole in the wall of the energy storage device.

3. The method of claim 1, wherein sealing the fill hole includes welding to seal the fill hole.

4. The method of claim 3, wherein welding includes an autogenous welding process.

5. The method of claim 3, wherein welding includes laser welding to seal the fill hole.

6. The method of claim 1, wherein the wall of the energy storage device has a thickness, and forming the fill hole includes forming the fill hole to an initial width at least approximately equal to the thickness.

7. The method of claim 1, wherein deforming the wall of the energy storage device includes reducing the width of the fill hole to at most approximately 0.016 inches.

8. The method of claim 1, further comprising fixing a redundant sealing member to the wall of the energy storage device after sealing the fill hole to substantially cover and redundantly seal a sealed area of the wall.

9. The method of claim 1, further comprising forming a recess in the wall of the energy storage device.

10. The method of claim 9, further comprising positioning a redundant sealing member in the recess and fixing the redundant sealing member to the wall of the energy storage device after sealing the fill hole to substantially cover and redundantly seal a sealed area of the wall.

11. The method of claim 10, wherein the redundant sealing member has a thickness and the recess has a depth, and the thickness of the redundant sealing member is at most equal to the depth of the recess.

12. The method of claim 10, wherein the redundant sealing member has a thickness and the recess has a depth, and the thickness of the redundant sealing member is greater than the depth of the recess.

13. The method of claim 1, wherein the wall includes an inner surface and an outer surface, and wherein deforming the wall causes at least one of the inner and outer surface to be nonplanar.

14. The method of claim 1, wherein deforming the wall changes a thickness of the wall.

15. The method of claim 1, wherein the fill hole is tapered with respect to an axis of the fill hole after deforming the wall of the energy storage device.

16. The method of claim 1, further comprising introducing an electrolyte into the energy storage device through the fill hole before sealing the fill hole.

17. A method of forming a battery comprising:
    punching a fill hole in a wall of the battery;
    plastically deforming the wall of the battery to reduce a width of the fill hole;
    introducing an electrolyte into the battery through the fill hole;
    laser welding the wall to seal the fill hole; and
    welding a redundant sealing member to the wall of the battery after laser welding the wall to substantially cover and redundantly seal a sealed area of the wall.

18. An energy storage device comprising:
    a housing that includes a wall;
    an electrolyte contained in the housing;
    a fill port assembly defined in the wall through which the electrolyte is introduced into the housing, the fill port assembly including a sealed area, the sealed area including a plastically deformed fill hole that has been sealed; and
    a redundant sealing member that is fixed to the wall, the redundant sealing member substantially covering and redundantly sealing the sealed fill hole.

19. The energy storage device of claim 18, wherein the fill hole is sealed by a weldment.

20. The energy storage device of claim 18, wherein the wall includes a recess adjacent the fill hole, and wherein the redundant sealing member is disposed in the recess.

21. The energy storage device of claim 20, wherein the redundant sealing member extends out of the recess.

22. The energy storage device of claim 20, wherein the redundant sealing member is contained entirely within the recess.

23. The energy storage device of claim 18, wherein the wall includes an inner surface and an outer surface, and wherein at least one of the inner surface and the outer surface is nonplanar adjacent the fill hole.

24. The energy storage device of claim 18, wherein the wall has a thickness that varies adjacent the fill hole.

* * * * *